US009113364B2

(12) United States Patent
Tan et al.

(10) Patent No.: US 9,113,364 B2
(45) Date of Patent: Aug. 18, 2015

(54) EXTENDED ACCESS POINT

(75) Inventors: Kun Tan, Beijing (CN); Wenjun Hu, Shanghai (CN); Guohan Lv, Sichuan (CN); Yongguang Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 443 days.

(21) Appl. No.: 13/571,010

(22) Filed: Aug. 9, 2012

(65) Prior Publication Data

US 2014/0241157 A1    Aug. 28, 2014

(51) Int. Cl.
*H04W 28/08* (2009.01)
*H04L 5/00* (2006.01)
*H04W 56/00* (2009.01)
*H04W 88/08* (2009.01)
*H04J 3/06* (2006.01)

(52) U.S. Cl.
CPC .............. *H04W 28/08* (2013.01); *H04J 3/0638* (2013.01); *H04L 5/0037* (2013.01); *H04W 56/00* (2013.01); *H04J 3/0661* (2013.01); *H04W 88/08* (2013.01); *H04W 88/085* (2013.01)

(58) Field of Classification Search
CPC ................ H04W 28/08; H04W 88/08; H04W 56/00–56/0095; H04L 5/0037; H04L 7/0008; H04L 7/0012; H04L 7/0033; H04L 7/0041; H04L 69/04; H04J 3/06–3/0697
USPC ......... 370/235, 252, 329, 336, 350, 503–520, 370/477; 455/502
See application file for complete search history.

(56) References Cited

U.S. PATENT DOCUMENTS

| 4,313,195 | A  | * | 1/1982 | Lehmann ....................... 370/540 |
| 6,438,367 | B1 | * | 8/2002 | Crawford ...................... 455/410 |
| 6,778,518 | B2 |   | 8/2004 | Jesse et al. |
| 7,420,955 | B2 |   | 9/2008 | Lee et al. |
| 8,358,723 | B1 | * | 1/2013 | Hamkins et al. .............. 375/341 |

(Continued)

FOREIGN PATENT DOCUMENTS

| EP | 1845740 |   | 10/2007 |
| GB | 2434948 | A * | 8/2007 |

(Continued)

OTHER PUBLICATIONS

Wolfrum et. al. "An Optimal Control Approach to Clock Synchronization," 2010, Institute of Electrical and Electronics Engineers.*

(Continued)

*Primary Examiner* — Mark Rinehart
*Assistant Examiner* — Kenneth P Hunt
(74) *Attorney, Agent, or Firm* — Brandon Roper; Judy Yee; Micky Minhas (57) ABSTRACT

An extended wireless access point may have many distributed radio units connected to associated processing units via a radio transmission network comprising commodity switches controlled by one or more network controllers. The one or more network controllers may use a load balancing algorithm to select a processing unit to process a signal received by a distributed radio unit. The radio units may receive a wireless signal, and generate compressed samples of the wireless signal for transport via the radio transmission network and processing by a selected processing unit. Similarly, a processing unit may generate and transmit via the radio transmission network compressed samples for decompression and transmission by a radio unit.

20 Claims, 7 Drawing Sheets

(56) References Cited

U.S. PATENT DOCUMENTS

| | | | |
|---|---|---|---|
| 2003/0112902 A1* | 6/2003 | Ghosh et al. | 375/347 |
| 2004/0240438 A1* | 12/2004 | Grossman | 370/389 |
| 2005/0032479 A1* | 2/2005 | Miller et al. | 455/67.11 |
| 2007/0093273 A1 | 4/2007 | Cai | |
| 2008/0192855 A1 | 8/2008 | Shapira et al. | |
| 2008/0267142 A1 | 10/2008 | Mushkin et al. | |
| 2009/0003422 A1* | 1/2009 | Ha | 375/225 |
| 2009/0296866 A1* | 12/2009 | Hsieh | 375/371 |
| 2010/0097934 A1* | 4/2010 | Hendel et al. | 370/237 |
| 2010/0260092 A1 | 10/2010 | Nagaraja | |
| 2011/0002410 A1 | 1/2011 | Forenza et al. | |
| 2012/0057572 A1 | 3/2012 | Evans et al. | |
| 2012/0176966 A1 | 7/2012 | Ling | |
| 2012/0189074 A1* | 7/2012 | Jin et al. | 375/267 |
| 2013/0044684 A1* | 2/2013 | Lee et al. | 370/328 |

FOREIGN PATENT DOCUMENTS

| | | |
|---|---|---|
| WO | WO2008088762 | 7/2008 |
| WO | WO 2014005759 A1 * | 1/2014 |

OTHER PUBLICATIONS

Muir, et al., "Distributed Antenna Systems plus Software Radio: Range Extension and Other Benefits", In Proceedings of Software Defined Radio Technical Conference, Nov. 2006, pp. 6.

Pato, et al., "On Building a Distributed Antenna System with Joint Signal Processing for Next-Generation Wireless Access Networks: The FUTON Approach", In Proceedings of 7th Conference on Telecommunications, May 3, 2009, pp. 4.

Aweya, et al., "Timing and synchronization of wireless base stations over packet networks", 2011 IEEE 54th International Midwest Symposium on Circuits and Systems, Aug. 7, 2011, pp. 1-4.

Jun, et al., "A time synchronization method for NTP", Real-Time Computing Systems and Applications, IEEE Computer Society, 1999, pp. 466-473.

PCT Search Report and Written Opinion mailed Mar. 7, 2014 for PCT Application No. PCT/US2013/054036, 18 Pages.

* cited by examiner

EXTENDED ACCESS POINT

BACKGROUND

In wireless radio systems, multiple-input and multiple-output (MIMO) systems involve the use of multiple antennas at both a transmitter and receiver to improve communication performance. MIMO uses the multiple antennas to coherently resolve more information than possible using a single antenna. A Distributed Antenna System (DAS) is a network of spatially separated antenna nodes connected to a common source using a transport medium that generally provides wireless service within a geographic area. A DAS will often replace a single antenna radiating at high power level with a group of low-power antennas to cover the same area.

MIMO operations require transporting large amounts of data (e.g., digital samples) to a central processing unit for joint decoding. Traditional implementations of MIMO are generally performed using a single device. Therefore, the scale of MIMO is limited, such that a number of cooperating antennas may only be in the range of 2-4. Traditionally, distributed-MIMO is only a MIMO system with special extended antenna cables for connecting the cooperating antennas to a radio.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This application describes techniques for implementing a wireless access point that may have many (e.g., greater than 1000) geographically distributed enhanced radio units (RUs) having one or more antennas. The extended wireless access point may be configured to support multiple-input-multiple-output (MIMO) operations among any of the distributed RUs. The RUs may each have a free running clock, such that the RUs are not required to share a common clock signal. The RUs may utilize structure-aware signal compression to compress digital samples of wireless signals (e.g., samples of baseband signals) based on a structure of the signal, and communicate the compressed digital samples with processing units (PUs) over a radio transport network (RTN). The RTN may be configured using commercial off the shelf (COTS) commodity network switches (e.g., Ethernet switches). One or more network controllers may provide load balanced routing of streams of compressed digital samples between RUs, network switches and PUs. The PUs may incorporate software defined radio functionality to process the compressed digital samples of signals received by RUs into associated digital bit streams, or process digital bit streams into associated compressed digital samples of signals for transmission by RUs.

In contrast, some DAS systems may employ distributed radios that transmit raw samples from a radio to a processing facility. Such systems require shared clocking so that the radios can stay synchronized, as well as significant bandwidth to facilitate the transmission of the raw samples.

Example implementations and embodiments are described below. In a first section, "Overview of a Radio Unit (RU)" discusses an example distributed enhanced radio that provides wireless access point functionality. A second section, "Overview of a Processing Unit (PU)," discusses encode/decode servers that process compressed samples. A further section, "Example Network Controller," discusses an example network controller that provides load balanced routing of streams of compressed digital samples between RUs, network switches and PUs. A further section, "Example Methods of Extended Access Point Operation," discusses example methods of operation of an extended access point. Finally, the application concludes with a brief "Conclusion." This Overview and the following sections, including the section headings, are merely illustrative implementations and embodiments and should not be construed to limit the scope of the claims.

Overview of a Radio Unit (RU)

The RU may be configured to operate as a wireless transceiver that modulates and demodulates wireless signals to facilitate communications with a multitude of fixed or mobile wireless devices, other APs and/or other wireless communications facilities. In an embodiment, an RU includes a distributed enhanced wireless access point (AP) having one or more directly connected antennas. As an example, an RU may facilitate communications using a variety of communication standards (e.g., IEEE, 802.11a, 802.11b, 802.11g, 802.11n, etc.), as well as proprietary or other communication standards. As such, an RU may be configured to utilize a variety of modulation/demodulation techniques, a variety of encoding/decoding techniques, a multitude of fixed or variable data rates, a multitude of variable or fixed channel bandwidths, and the like.

A large number (e.g., a thousand or more) of RUs may be distributed across a geographic area (e.g., in and around a large building or skyscraper, within a portion of a campus, within a portion of a metropolitan or rural area, etc.) to create a network of distributed RUs that may operate together as a part of an extended wireless access point with MIMO functionality. Each of the multiple RUs may have a free running local clock, such that the multiple RUs are not required to share a common clock for synchronization of transmission and/or reception of signals. Thus, the multiple RUs are not constrained to have dedicated cabling or wiring to facilitate timing synchronization between the multiple RUs. In an embodiment, the distributed RUs may operate together to form a distributed MIMO system that exploits the availability of the multiple distributed RUs in order to enhance the communication capabilities of each individual distributed RU.

In an example embodiment, a RU may include a commodity wireless access point that has been enhanced to support operation with the extended wireless access point. As such, a RU may include enhancements that facilitate significant data compression and decompression of streams of raw digital samples of a variety of baseband signals. A RU so enhanced may be configured to perform data compression and decompression of signal samples that is specific to a type of signal being received or transmitted. Thus, a RU may determine a type of a signal and exploit time and/or frequency domain characteristics specific to the signal to perform data compression and decompression of the signal samples.

As an example, to facilitate data compression relative to raw samples of a baseband signal, the RU may apply additional or more precise filtering of a baseband signal to facilitate down-sampling after the proper filtering is applied. The RU may remove one or more time domain guard times and/or remove one or more guard frequency bands to facilitate compression of signal samples. Signal-to-Noise-Ratio (SNR) based adaptive quantization may be used to quantize signal samples, subject to an acceptable determined SNR level, to further compress digital signal samples. As such, an RU may be configured to significantly compress a stream of raw digital samples of a baseband signal to create compressed digital samples, achieving compression ratios that may exceed 8:1. Conversely, an RU may be configured to decompress a stream of compressed digital samples to essentially provide the associated raw digital samples to reconstruct an associated baseband signal for modulation and transmission.

In an embodiment, RUs may be configured to receive a radio broadcast reference signal from one or more other RUs to determine a clock synchronization offset between the reference signal and a local free running clock of each of the RUs. As an example, RUs may be configured and/or enhanced such that a first RU can receive a broadcast reference signal from a second RU. The first RU may then determine a difference, and/or offset, (e.g., frequency and/or phase) between the local clock of the first RU and the broadcast reference signal transmitted by the second RU. As such, each RU that receives the broadcast reference signal may determine an associated difference and/or offset between the reference signal and each receiving RU's local clock. Each RU may maintain this difference and/or offset to facilitate communication synchronization among the multiple RUs. Therefore, at least one of the multiple RUs may be configured to broadcast the reference signal to other RUs. The reference signal may include any of a variety of waveforms suitable to facilitate an extraction of clocking information (e.g., repeating code or sequence, pilot signal, etc.)

In an embodiment, RUs may be configured to add timestamps to compressed digital samples of received signals, and extract timestamps from compressed digital samples prior to decompression and transmission. RUs may use these timestamps to further facilitate synchronization between the multiple distributed RUs, as will be further described herein.

Overview of a Processing Unit (PU)

In an embodiment, a PU may include an encode/decode server configured to encode a digital data stream into a stream of compressed digital samples for decompression and transmission by a RU, and/or receive a stream of compressed digital samples from an RU for decoding into an associated digital data stream. Therefore, a PU may include software defined radio functionality for processing compressed digital samples of various types of baseband signals.

In an embodiment, as part of encoding a digital data stream into a stream of compressed digital samples for transmission by an RU, the PU may be configured to add timestamps to compressed digital samples. Such timestamps may be used to facilitate timing synchronization by one or more transmitting RUs. As an example, a group of PUs may be configured to collaborate to generate and insert timestamps into compressed samples that control when a group of associated distributed RUs will transmit wireless signals corresponding to their associated compressed samples.

Overview of a Radio Transmission Network (RTN)

RUs and PUs may communicate compressed digital samples via a radio transmission network (RTN). In an embodiment, the RTN includes tier 1 and tier 2 commodity Ethernet switches. The tier 2 switches may include high capacity switches having high capacity (e.g., 10 Gbps) interface ports. Tier 1 switches may include lower capacity switches having, for example, 10 Gbps ports and 1 Gbps ports. In an embodiment, tier 1 and tier 2 switches are connected such that every tier 1 switch is connected to every tier 2 switch, forming a bipartite graph or bigraph type connection topology between tier 1 and tier 2 switches. In an alternate embodiment, the RTN may include multiple tiers of switches, such that each switch in one tier is connected to each switch in a successive tier via a fat tree, bipartite graph or bigraph type connection topology.

In an embodiment, the tier 1 switches of the RTN may be divided into two groups. As an example, one group of tier 1 switches may provide a dedicated switch port connection to each of the multiple RUs of the system, while the other group of tier 1 switches may provide a dedicated switch port connection to each of the multiple PUs of the system. Communications between an RU and an associated PU may be routed through an associated tier 1 switch of the RU, via a tier 2 switch, to an associated tier 1 switch of a corresponding PU. Routing of communications between RUs and PUs may be performed by one or more network controllers. The RTN may also include one or more ingress routers to facilitate connectivity to other networks, intranets, internets, or the like.

Overview of a Network Controller

A network controller may be configured to interface to the RTN and determine a PU to process compressed samples of a signal received by a RU, and determine an RU to process compressed samples provided by a PU. The network controller may be further configured to determine one or more communication switches within the RTN to facilitate switched connectivity between an associated RU/PU pair.

As an example, if an RU associated with a tier 1 switch receives a signal, a network controller may detect that the RU has received a signal and determine which PU will process the compressed digital samples from the RU. In making this determination, the network controller may also determine which tier 2 switch, and associated dedicated port of the tier 2 switch, will be used to switch the compressed digital samples to the associated tier 1 switch of the selected PU.

In an embodiment, the network controller may be configured to use a load balancing algorithm to facilitate determining which PU will be used to process a signal received by an RU and which tier 2 switch will be used to connect the RU/PU pair.

Example Architecture

Figure 1:
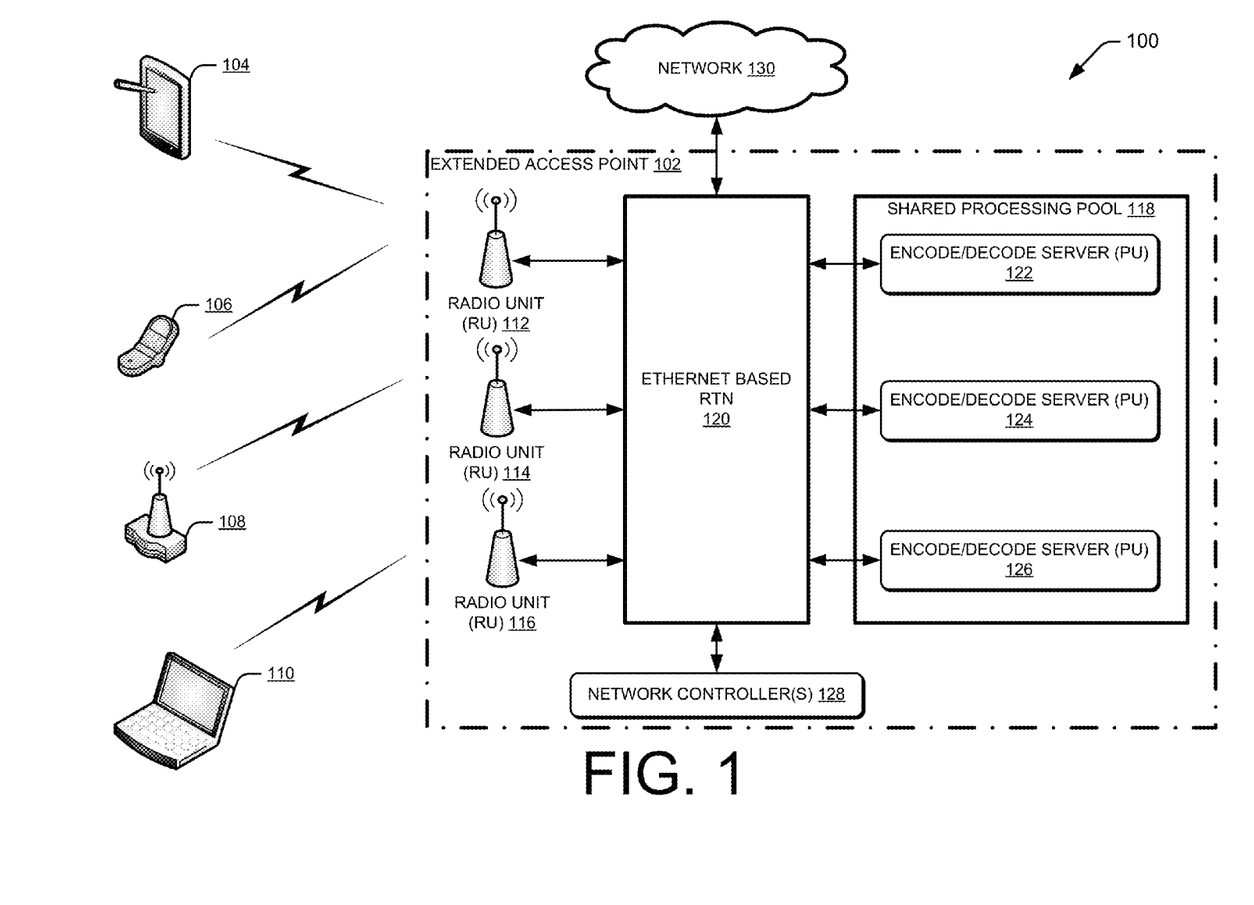
FIG. 1 is a diagram showing a high-level view of an example extended access point architecture.

FIG. 1 is a schematic diagram of example architecture 100 that includes extended access point 102. As shown in FIG. 1, extended access point 102 may wirelessly communicate with external wireless devices 104-110 exemplified by wireless tablet computer 104, cellular telephone (e.g., smart phone) 106, access point or other wireless communications network 108 and wireless laptop 110, as well as other wireless devices.

Extended access point 102 is shown as having three distributed radio units (RUs) 112-116 for communicating with external wireless devices 104-110, however, this number of RUs is arbitrary as the system supports a much larger number of RUs (e.g., greater than 1000 RUs). RUs 112-116 are shown connected to shared processing pool 118 via Ethernet based Radio Transmission Network (RTN) 120. Shared processing pool 118 is shown containing encode/decode servers (i.e., processing units (PUs)) 122-126. In an embodiment, PUs 122-126 may be centrally located (e.g., in a data center) that is remote from RUs 112-116. In an alternate embodiment, PUs 122-126 may be located in multiple locations (e.g., in multiple data centers) remote from RUs 112-116 and connected via RTN 120. As an example, extended access point 102 may contain an equal number of PUs and RUs such that at any time there is a PU available to process samples from an RU. Each of RUs 112-116 and each of PUs 122-126 may be connected to RTN 120 via a dedicated port, such as a dedicated switch port of RTN 120, such that there is never a bandwidth bottleneck or bandwidth contention between RUs and PUs.

Network Controller(s) 128 may interface with RTN 120 to facilitate routing of streams of compressed digital samples of signals between RUs 112-116 and PUs 122-126, as well as other functions described herein. As an example, if RU 112 receives a wireless signal from client device 104, RU 112 may generate highly compressed digital samples of the wireless signal. Upon detection of the received signal by RU 112, network controller(s) 128 may select a PU, such as PU 124, to decode the compressed digital samples. Network controller(s) 128 may also select one or more switches in RTN 120 to facilitate routing of the compressed digital samples between RU 112 and PU 124. Once PU 124 decodes the compressed digital samples into a corresponding decoded data stream, in an embodiment, network controller(s) 128 may facilitate routing of the decoded data stream, for example, to an entity communicatively coupled to external network 130.

Continuing with this example, if RU 112 received a signal from client device 104 as part of a request for an internet based transaction with an internet web server communicatively coupled to external network 130, network controller(s) 128 may maintain a mapping between client device 104 and RU 112, such that when a response to the request is received from the internet web server via network 130, network controller(s) 128 may then select one of the PUs to route the response to for processing. The selected PU would then encode the response into an associated stream of compressed samples, and network controller(s) 128 may select and direct one or more switches in RTN 120 so that the compressed samples of the response would be routed to RU 112 for transmission of the response to requesting device 104. In an embodiment, network controller(s) 128 may monitor extended access point 102 to obtain knowledge to facilitate routing of the response to a different RU that has wireless access to client device 104 to provide the associated response.

Figure 2:
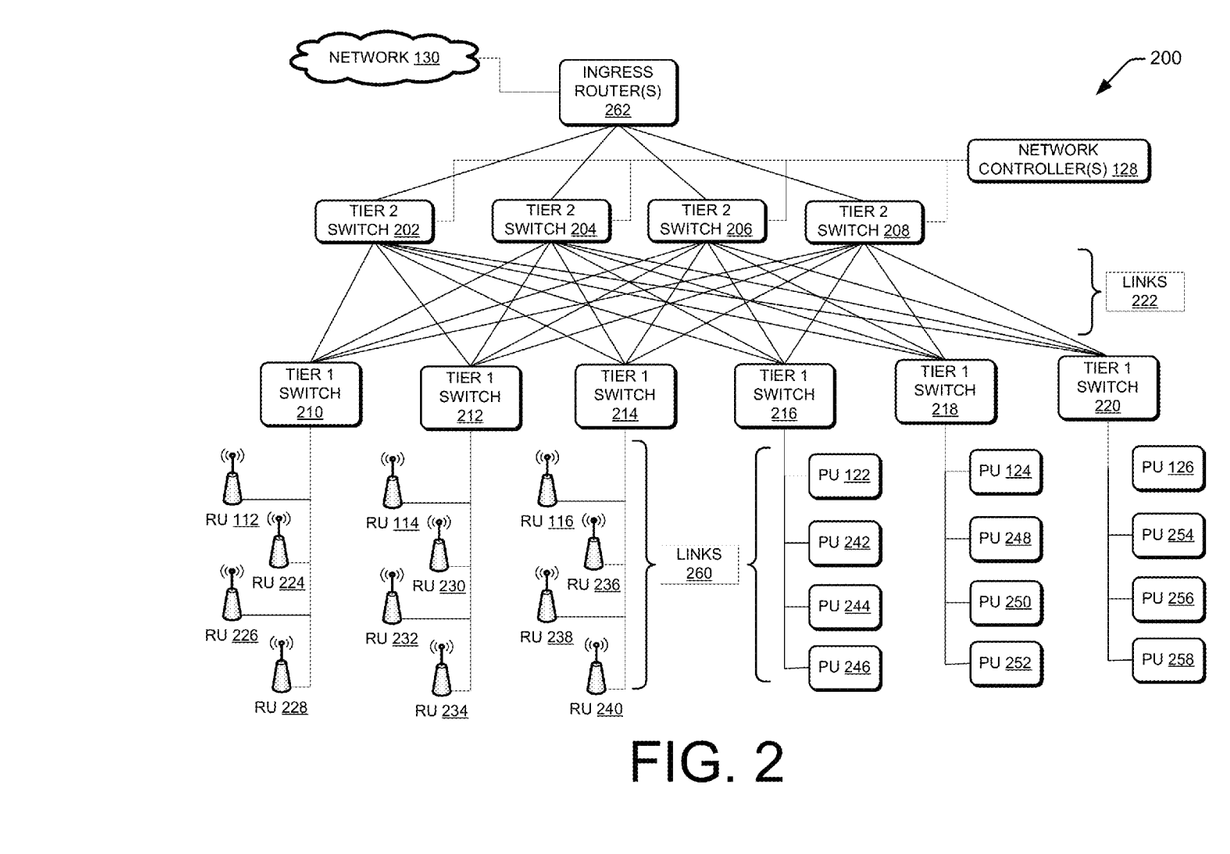
FIG. 2 is a schematic diagram showing additional details of an example Ethernet based radio transport network (RTN) and an extended access point architecture.

FIG. 2 is a schematic diagram of example architecture 200 that includes extended access point 102. In example architecture 200, network controller(s) 128 may interface to ports of tier 2 switches 202-208. Tier 2 switches 202-208 may connect to tier 1 switches 210-220. In an embodiment, every tier 2 switch 202-208 is connected to every tier 1 switch 210-220 via dedicated switch ports of each of the tier 1 and tier 2 switches. As an example, tier 2 switches may be connected to tier 1 switches using a fat tree network topology, such that a constant bandwidth may exist between every RU and every PU. Such a connection topology may act to assure that no bandwidth bottleneck exists between any RU and PU pair.

As an example, tier 2 switch 202 uses a first dedicated port to connect to a dedicated port of tier 1 switch 210, a second dedicated port to connect to a dedicated port of tier 1 switch 212, a third dedicated port to connect to a dedicated port of tier 1 switch 214, a fourth dedicated port to connect to a dedicated port of tier 1 switch 216, a fifth dedicated port to connect to a dedicated port of tier 1 switch 218 and a sixth dedicated port to connect to a dedicated port of tier 1 switch 220. Tier 2 switches 204-208 may be connected to tier 1 switches 210-220 in a similar manner using additional unique dedicated port pairs of each of the tier 1 and tier 2 switches.

In an embodiment, tier 2 switches 202-208 comprise high capacity aggregate switches with high data rate ports. As an example, tier 2 switches 202-208 may comprise high capacity aggregate Ethernet switches with 10 Gbps port speeds. Thus, links 222 may comprise high speed connections between individual high speed dedicated ports of tier 2 switches 202-208 and high speed dedicated ports of tier 1 switches 210-220.

Tier 1 switches further include dedicated ports that may each connect to an RU or a PU. As shown in FIG. 2, tier 1 switches 210-214 provide a dedicated port connection to each of distributed RUs 112-116 and 224-240. Similarly, tier 1 switches 216-220 provide a dedicated port connection to each of PUs 122-126 and 242-258.

In an embodiment, tier 1 switches 210-220 may comprise Top-of-Rack (ToR) switches having dedicated port speeds of 1 Gbps connecting RUs or PUs, and 10 Gbps dedicated port speeds connecting to tier 2 switches 202-208. Example architecture 200 may also include one or more ingress routers 262 that facilitate connectivity to network 130.

As an example of operation of architecture 200, RU 240 may receive a request for a server (not shown) accessible via network 130 from device 110 of FIG. 1. RU 240 may determine the type of wireless signal received and demodulate the wireless signal to a corresponding baseband signal. Based on the determined signal type, RU 240 may apply one or more types of compression to the baseband signal and/or samples of the baseband signal to create a stream of highly compressed samples of the baseband signal. The one or more types of compression applied by RU 240 would assure that a data rate of the compressed samples would not exceed the available bandwidth of the dedicated link between RU 240 and tier 1 switch 214.

Meanwhile, network controller(s) 128 may determine or detect that RU 240 was receiving a signal. In response, network controller(s) 128 may select a tier 2 switch and a PU, for example, tier 2 switch 204 and PU 242. Having selected a tier 2 switch 204 and a PU 242, network controller(s) 128 may then direct tier 1 switch 214, tier 2 switch 204 and tier 1 switch 216 to switch the stream of compressed samples from RU 240 to PU 242 for processing.

Continuing with this example, PU 242 may convert the compressed samples to an associated bit stream (e.g., one or more data packets) that comprise a request for an internet server accessible via network 130 or via router 262. In an embodiment, network controller(s) 128 may then facilitate routing of the associated bit stream to ingress router(s) 262 for transport over network 130 to the internet server. In an alternate embodiment, PU 242 may facilitate routing of the associated bit stream to the internet server via an alternate connection (not shown).

Network controller(s) 128 may maintain a relationship between the request from client 110 and RU 240 that received the request. In the event that a response to the request is generated by the internet server, network controller(s) 128 may be configured to associate the response with the request and select a PU to process the response.

In an example embodiment, to provide the response to client 110, network controller(s) 128 may select tier 2 switch 208 to route the response and PU 258 to process the bit stream response. In this embodiment, network controller(s) 128 may direct ingress router(s) 262 to route the bit stream response to tier 2 switch 208, and direct tier 2 switch 208 and tier 1 switch 220 to switch the bit stream response to PU 258. Thus, FIG. 2 is just one example implementation, as in an embodiment, network controller(s) 128 may also be connected to one or more of tier 1 switches 210-220, and/or ingress router(s) 262, such that network controller(s) 128 may connect to any network component of example architecture 200. In an alternate embodiment, tier 2 switch 208 may be selected randomly or by ingress router(s) 262, and network controller(s) 128 may direct tier 2 switch 208 to switch the bit stream response to tier 1 switch 220 which then switches the bit stream response to PU 258.

PU 258 may then convert the bit stream response into associated compressed response samples. Network controller(s) 128 may then select a tier 2 switch, for example, tier 2 switch 202, for routing of the compressed response samples. In this event, network controller(s) 128 may then direct tier 1 switch 220, tier 2 switch 202 and tier 1 switch 214 to switch the compressed response samples to RU 240 for processing. At this point, RU 240 would decompress the compressed response samples, construct the associated baseband signal from the compressed response samples, apply the appropriate modulation/encoding to the baseband signal and wirelessly transmit the response to client 110. In an alternate embodiment, network controller(s) 128 may select a different tier 2 switch, tier 1 switch and/or RU to provide the response to client 110. In this embodiment, network controller(s) 128 may know a-priori that client 110 is accessible via a RU other than RU 240.

In an embodiment, network controller(s) 128 employs a load balancing algorithm for selecting tier 2 switches and/or PUs. For example, network controller(s) 128 may employ a Valiant load balance algorithm, or other suitable load balance algorithm for selecting tier 2 switches and/or PUs such that no bandwidth bottleneck exists between a selected PU and an associated RU. Network controller(s) 128 may monitor to maintain port loading information on tier 2 switches, tier 1 switches, as well as loading information on PUs to facilitate employing a load balancing algorithm.

Example architecture 200 allows for compressed samples to be routed between any RU and any PU. Scalability may be easily accomplished by adding additional RUs and PUs when unused switch ports are available. Tier 1 and/or tier 2 switches may be easily added to increase a number of dedicated switch ports to facilitate additional RU and PU deployment. Utilizing example architecture 200 assures that there is never bandwidth contention between an RU and an associated PU, since no bandwidth bottlenecks exist.

As an example of an alternate architecture, assume there are four tier 2 switches each supporting 64 high speed switch ports. Therefore, there may be 64 tier 1 switches each having four high speed ports, wherein each port is connected to one of the tier 2 switches. Assume each tier 1 switch supports 48 downlink ports. Such a system architecture may then support 32×48=1538 RUs and 32×48=1538 PUs. Note that FIG. 2 is just one example implementation, as there may be multiple tiers of switches greater than the two tiers shown in FIG. 2. As such, the switches may include commodity switches configured in multiple tiers of switches, a first of the multiple tiers of switches connected to a second of the multiple tiers of switches via a fat tree, bipartite graph or bigraph type connection topology. Thus, each switch in one tier of the multiple tiers may be connected to each switch in a successive tier of the multiple tiers via a fat tree, bipartite graph or bigraph type connection topology, as similarly shown by the connections between the tier 1 and tier 2 switches in FIG. 2.

Example Radio Unit

Figure 3:
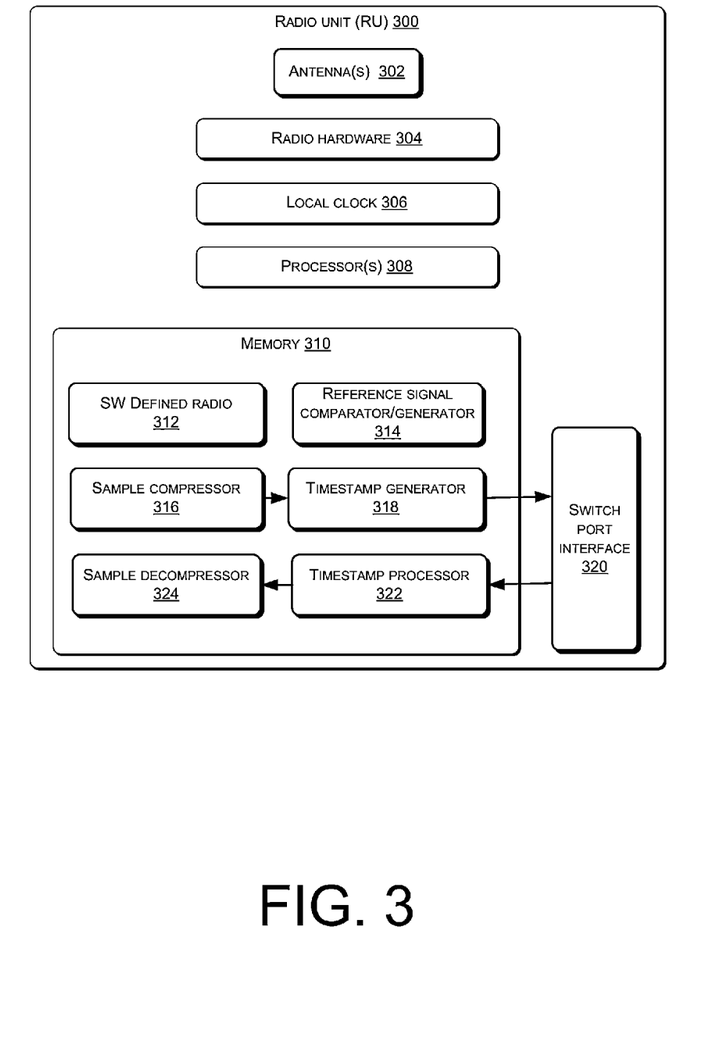
FIG. 3 is a schematic diagram showing details of an example radio unit that provides distributed wireless access point functionality.

FIG. 3 is a schematic diagram showing additional details of an example distributed radio unit (RU) 300 as shown in FIGS. 1 and 2. RU 300 may include one or more antennas 302. Antenna(s) 302 may be used for transmission and reception of wireless signals with, for example, devices 104-110 of FIG. 1. Additionally, antenna(s) 302 may be used for transmission and/or reception of a broadcast reference signal used to facilitate synchronization among multiple RUs. Antenna(s) 302 may be internal to RU 300, externally connected (e.g., via one or more direct connections and/or one or more cables) to RU 300, or combinations of both.

Radio hardware 304 may include hardware components that facilitate the transmission and reception of wireless signals. Examples of such hardware components include amplifiers, attenuators, mixers, local oscillators, filters, digital signal processors, and the like, that facilitate demodulation of signals received by antenna(s) 302 and modulation of signals to be transmitted over antenna(s) 302.

RU 300 may also include a local free running clock 306. As an example, each of RUs 112-116 and 224-240 of FIG. 2 may include their own local free running clock, such that each of the local free running clocks run independently from each other. Depending on a type of signal being processed, local clock 306 may provide a direct or indirect local clocking reference for processing of signal samples by RU 300. RU 300 may also include one or more processors 308 communicatively coupled to memory 310. RU 300 may also include a software defined radio 312 for processing signals received by RU 300 and for processing signals to be transmitted by RU 300.

For wireless signals received by RU 300 via antenna(s) 302, software defined radio 312 may work in conjunction with radio hardware 306 to facilitate demodulation and decoding of the received wireless signal. Software defined radio 312 may further act to control various hardware components of radio hardware 304, as well as augment or replace a requirement for certain hardware components to be present in radio hardware 304. Software defined radio 312 may also be configured to determine, or facilitate determination of, a type of the received wireless signal. In an embodiment, software defined radio 312 provides a baseband signal associated with the received wireless signal.

If software defined radio 312 determines that a received wireless signal is a broadcast reference signal, reference signal comparator/generator 314 may be employed to evaluate the broadcast reference signal. Reference signal comparator/generator 314 may then determine and maintain a difference, and/or an offset, between local clock 306 and the received broadcast reference signal. Such an offset or difference may include a frequency difference, a phase difference, or the like. Conversely, if RU 300 is selected to provide the broadcast reference signal, reference signal comparator/generator 314 may be employed to generate the broadcast reference signal. In an embodiment, reference signal comparator/generator 314 may derive the broadcast reference signal from local clock 306. Once generated, reference signal comparator/generator 314 may provide the broadcast reference signal to software defined radio 312 which may work in conjunction with radio hardware 304 to modulate and transmit the reference signal via antenna(s) 302.

Alternatively, if software defined radio 312 determines that a received wireless signal is not a broadcast reference signal, but rather a signal from a wireless device, such as one of devices 104-110, software defined radio 312 may facilitate generation of a baseband signal and determination of an associated signal type. Software defined radio 312 may then operate in conjunction with sample compressor 316, which may generate a stream of compressed samples of the baseband signal based at least in part on the signal type. Note that depending on the signal type, the baseband signal may comprise multiple baseband signals corresponding to, for example, a received wireless signal having multiple sub-channels.

Sample compressor 316 may exploit a variety of compression techniques to generate a stream of compressed samples of the baseband signal. In the context of this disclosure, the stream of compressed samples of the baseband signal comprises fewer bits per second (bps) as compared to a stream of raw samples of the baseband signal prior to any compression by sample compressor 316. As an example, assuming the received wireless signal was received within a 20 MHz bandwidth, the data rate of the stream of raw samples of the baseband signal may be 1.2 Gbps. Conversely, the data rate of the stream of compressed samples of the baseband signal generated by sample compressor 316 may be 200 Mbps.

As an example of a compression technique, sample compressor 316 may exploit down-sampling in processing of the baseband signal. For example, even though a received wireless signal was received in a 20 MHz radio frequency (RF) bandwidth, the information encoded in the wireless signal may be sufficiently captured in a narrower RF bandwidth, such as an 18 MHz RF bandwidth. Therefore, sample compressor 316 may work in conjunction with software defined radio 312 to apply more precise filtering of the wireless and/or baseband signal, resulting in fewer required samples per second associated with the reduced bandwidth. As an example, down-sampling may reduce a data rate of samples by 2-4 times.

As another example of compression techniques, based on the determined type of received wireless signal, sample compressor 316 may process the baseband signal to exploit removal of one or more time-domain guard bands and/or removal of one or more guard frequency bands, resulting in fewer required samples per second. As an example, removal of time-domain guard bands may reduce a data rate of samples by over 15%, while removal of guard frequency bands may reduce a data rate of samples by approximately 20%.

As another example of a compression technique, sample compressor 316 may exploit a signal-to-noise ratio (SNR) based adaptive quantization to reduce a number of required bits per sample. To accomplish this, least significant bits in samples may be removed until a minimum measured SNR threshold is reached. Then, based on the measured SNR, a minimum number of bits per sample may be determined. Assuming a high SNR operating environment, as an example, SNR-based adaptive quantization may reduce the data rate of samples by approximately 50%. Alternatively, in a low SNR environment, the least significant bits can also be removed if they are under the noise/interference floor.

Therefore, sample compressor 316 may exploit one or more of the example compression techniques described above, and/or other compression techniques, to generate compressed samples of the baseband signal that occupy significantly less bandwidth than corresponding raw samples of the baseband signal.

Thus, in an embodiment, RU 300 may receive a wireless signal, determine a type of the wireless signal, demodulate the wireless signal to at least one baseband signal, process the at least one baseband signal based on the signal type, sample the processed at least one baseband signal to create a stream of samples and create a stream of compressed samples based in part on the processing and the compressing.

Sample compressor 316 may provide the stream of compressed samples to timestamp generator 318 which may include timestamps with the compressed samples. As an example, timestamp generator 318 may include the timestamps periodically or a-periodically into compressed samples of the stream of compressed samples, or into each compressed sample. Timestamp generator 318 may provide the compressed samples with timestamps to switch port interface 320 for transport via the RTN as described herein.

In an embodiment, timestamp generator 318 may generate timestamps that are relative to a local time at RU 300. In an alternate embodiment, timestamp generator 318 may generate timestamps that are relative to a different time, such as a time associated with a reference signal.

Alternatively, for a signal to be transmitted by RU 300 via antenna(s) 302, a stream of compressed samples may be provided by a PU via the RTN and switch port interface 320 to timestamp processor 322 of example RU 300. As the compressed samples are received, timestamp processor 322 may extract the timestamps from the compressed samples. In an embodiment, timestamp processor 322 may use these extracted timestamps to control a timing of when the compressed samples are passed to sample decompressor 324. Timestamp processor 322 may further use the difference, and/or the offset between local clock 306 and the received broadcast reference signal maintained by reference signal comparator/generator 314 to further control a timing of when the compressed samples are passed to sample decompressor 324. In an alternate embodiment, timestamp processor 322 may use the timestamps, as well as the difference and/or the offset, to control when a wireless signal associated with the compressed samples is transmitted by RU 300.

Once timestamp processor 322 determines that the compressed samples may be processed, sample decompressor 324 may work in conjunction with software defined radio 312 to determine a type of the RF wireless signal that is to be transmitted by RU 300, and decompress the stream of compressed samples to construct an appropriate baseband signal based on the determined signal type. Software defined radio 312 may work in conjunction with radio hardware 304 to properly modulate/encode the baseband signal to create a corresponding RF wireless signal for transmission via antenna(s) 302 of RU 300.

Thus, timestamp processor 322 may be configured to provide the stream of compressed samples to sample decompressor 324 such that the corresponding RF wireless signal is transmitted as indicated by the timestamps. In a further embodiment, timestamp processor 322 may use the difference and/or offset between local clock 306 and the received broadcast reference signal to adjust a clocking of the compressed samples by sample decompressor 324 such that the corresponding RF wireless signal is transmitted as indicated by the timestamps.

In an embodiment, a PU that provided the stream of compressed samples to timestamp processor 322 may have inserted timestamps into the compressed samples that indicate when the PU wants RU 300 to transmit the corresponding RF wireless signal. Thus, the ability for PUs to enter timestamps to control when RUs transmit wireless signals allows PUs to use RUs in a collaborative fashion. This allows multiple RUs to collaboratively transmit signals at the same time, or at a precisely determined time, providing very high order MIMO, as well as true distributed high order MIMO functionality, while using distributed radio units that have free running clocks. Therefore, extended access point 102 may support MIMO operations among any of its distributed RUs.

Example Processing Unit

Figure 4:
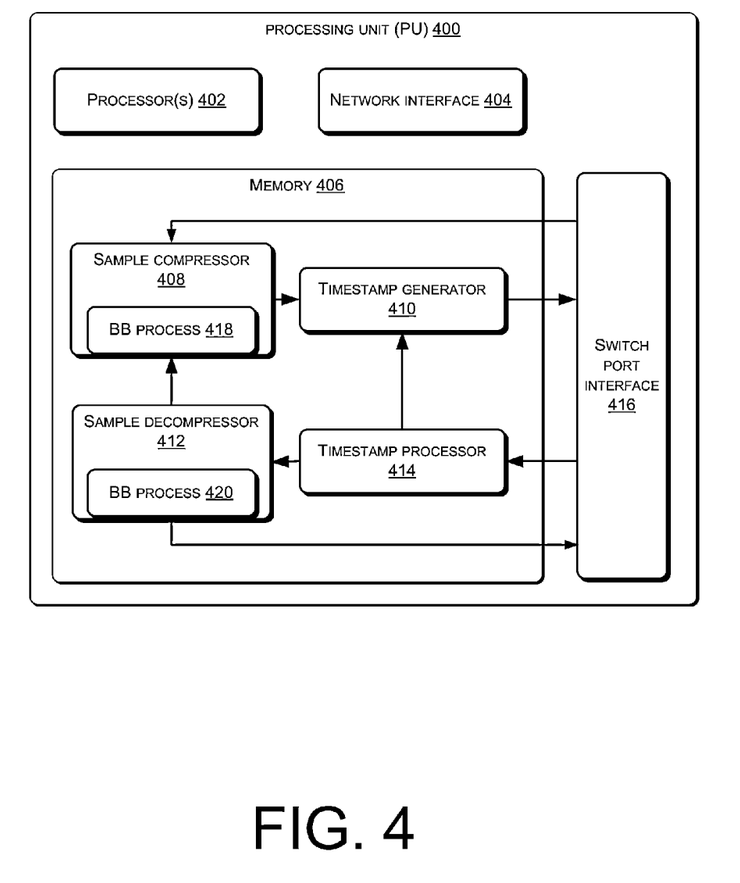
FIG. 4 is a schematic diagram showing details of an example processing unit.

FIG. 4 is a schematic diagram showing details of an example processing unit (PU), such as one of encode/decode servers 122-126 shown in FIG. 1. Example encode/decode server 400 may comprise a commodity server (e.g., multi-core server) and include one or more processors 402, at least one network interface 404 and memory 406 communicatively coupled to one or more processors 402.

Memory 406 may contain modules executed by processors 402, such as sample compressor 408, timestamp generator 410, sample decompressor 412 and timestamp processor 414. These various modules may communicate with switch port interface 416 to provide connectivity to a switch, such as an associated tier 1 switch.

In an embodiment, sample compressor 408 may receive a bit stream (e.g., packets, cells, frames, etc.) via switch port interface 416 for processing. As an example, the bit stream may be destined for one or more of devices 104-110 provided via an entity communicatively coupled to network 130. In an alternate embodiment, sample compressor 408 may receive the bit stream via a different network connection, such as network interface 404.

Sample compressor 408 may determine a type of signal used for wirelessly transmitting the bit stream and encode the bit stream into a stream of compressed samples based on the determined signal type. As an example, sample compressor 408 may employ baseband processor 418 to facilitate encoding of the bit stream into a stream of samples, and then compress the samples to create the stream of compressed samples. As an alternate example, sample compressor 408 may employ baseband processor 418 to encode the bit stream directly into the stream of compressed samples. Baseband processor 418 may include a component in memory 406 as shown in FIG. 4, or include hardware that may not necessarily be included in memory 406. Sample compressor 408 may infer the signal type based on analysis of the bit stream, based on information provided by network controller(s) 128, based on knowledge of a corresponding signal (e.g., a signal type of a corresponding request), or the like. Timestamp generator 410 may determine timestamp values, and incorporate the timestamp values into the stream of compressed samples. The stream of compressed samples with timestamps may be passed to switch port interface 416, and routed to an appropriate RU for transmission by network controller 128 via RTN 120.

In an embodiment, the timestamp values incorporated by timestamp generator 410 may indicate a time when the associated RU is to transmit the wireless signal associated with the stream of compressed samples. Timestamp generator 410 may be configured to determine the timestamp values based on calculations and/or a-priori obtained knowledge of extended access point 102 configuration and/or signal latencies through RTN 120 as well as latencies associated with the associated RU. The timestamp value may be further alternated and refined by the associated RUs based on a specific medium access control (MAC) protocol. For example, the associated RUs may defer the transmission until all RUs sense the wireless channel clean.

Alternatively, for a received stream of compressed samples, timestamp processor 414 may be configured to extract timestamp values from compressed samples received via switch port interface 416. In an embodiment, timestamp processor 414 may analyze one or more timestamp values to determine a time to forward the received compressed samples to sample decompressor 412. Sample decompressor 412 may determine a signal type associated with the compressed samples and decode the compressed samples to generate an associated bit stream. As an example, sample decompressor 412 may decompress the compressed samples and employ baseband processor 420 to encode the decompressed compressed samples into the associated bit stream. As an alternate example, sample decompressor 412 may employ baseband processor 420 to decode compressed samples directly into the associated bit stream. Baseband processor 420 may include a component in memory 406 as shown in FIG. 4, or include hardware that may not necessarily be included in memory 406. In one example embodiment, the associated bit stream may comprise data (e.g., packets, cells, frames, etc.) destined for an entity communicatively coupled to network 130. Therefore, sample decompressor 412 or baseband processor 420 may provide the associated bit stream to switch port interface 416 for routing to ingress router 262 by network controller 128 via RTN 120. In a different embodiment, sample decompressor 412 or baseband processor 420 may provide the associated bit stream to a different network device (e.g., network interface 404) for routing to an entity communicatively coupled to network 130.

In another example embodiment, regarding a received stream of compressed samples, sample decompressor 412 may determine that the associated bit stream is destined for a device, such as one of devices 104-110. In this example embodiment, sample decompressor 412 or baseband processor 420 may provide the associated bit stream to sample compressor 408 for encoding, to timestamp generator 410 for adding timestamp values and to switch port interface 416 for routing by network controller 128 via RTN 120 to an appropriate RU for transmission to a device. In an alternate embodiment, regarding a received stream of compressed samples, timestamp processor 414 extract timestamps and provides the received stream of compressed samples to timestamp generator 410 for adding timestamp values and to switch port interface 416 for routing by network controller 128 via RTN 120 to an appropriate RU for transmission to a device.

In an embodiment, PU 400 may use network interface 404 and/or RTN 120 to collaborate with other PUs. As an example, PUs may collaborate so that multiple PUs may determine appropriate timestamp values to incorporate into each of their associated streams of compressed samples to control a timing of when each of the multiple stream's associated wireless signals will be transmitted by a corresponding RU. Thus, timestamp generator 410 may generate timestamp values based on collaborative communication with other PUs and/or communication with network controller 128.

Example Network Controller

Figure 5:
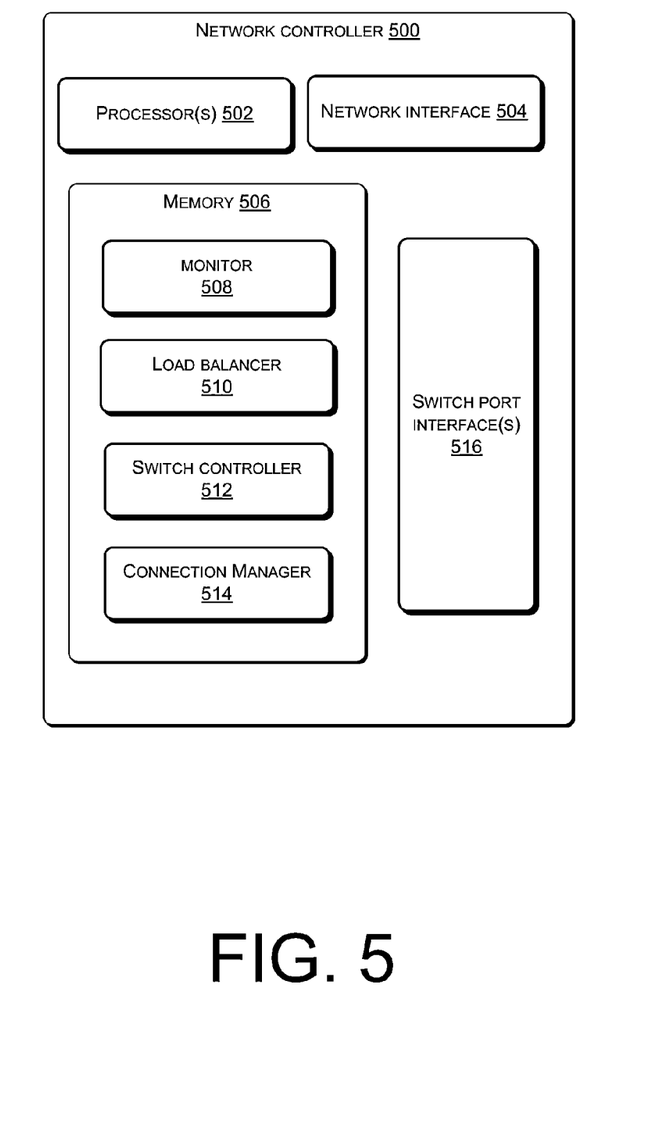
FIG. 5 is a schematic diagram showing details of an example network controller.

FIG. 5 is a schematic diagram showing details of an example network controller 500, such as one of network controller(s) 128 shown in FIG. 1. Network controller 500 may include one or more processors 502, at least one network interface 504 and memory 506 communicatively coupled to processor(s) 502. Memory 506 may contain modules executed by processor(s) 502, such as, monitor 508, load balancer 510, switch controller 512 and connection manager 514. Certain of these various modules may communicate with switch port interface(s) 516 for communication with and/or control of switches, PUs and RUs.

Monitor 508 may be configured to access switches, such as tier 2 switches 202-208 as well as tier 1 switches 210-220 of FIG. 2, to monitor availability, switch fabric status, error conditions, load, port status, active connections, switch configurations, or the like. Monitor 508 may access switches to obtain and maintain knowledge of a current topology of switches in RTN 120, as well as a configuration and availability of RUs and PUs connected to RTN 120. Monitor 508 may detect when an RU receives a signal that requires routing to a PU for processing and when a PU receives a signal that requires routing to a RU. Monitor 508 may access PUs, as well as RUs, to obtain loading and status information.

Load balancer 510 may implement a load balancing algorithm to select a PU to process a signal received by a RU. In an embodiment, the load balancing algorithm may comprise a Valiant load balancing algorithm, or the like. As an example, upon detection of a signal received at an RU, load balancer 510 may select a PU to process the received signal, as well as a tier 2 switch to route the received signal between the RU and the selected PU. Conversely, upon detection of a signal received at a PU, load balancer 510 may select a tier 2 switch to route the received signal between the PU and an associated RU. In an alternate embodiment, load balancer 510 may implement a load balancing algorithm to select a PU to process compressed samples received by a RU, and randomly select a tier 2 switch to route the compressed samples between the PU and an associated RU, or to route compressed samples between a RU and a PU.

Switch controller 512 may access switches in RTN 120 to effectively control switch connections between RUs and PUs based at least on selections made by load balancer 510.

Connection manager 514 may track various connections made through extended access point 102. As an example, if a device 104 transmits a wireless request received and processed by RU 112 to access a web server communicatively coupled to network 130, connection manager 514 may associate the request with device 104 and RU 112. If the web server provides a response to the request (e.g., a data stream, access to a cloud resource, web page, data record, etc.), connection manager 514 may facilitate load balancer 510 to select a route that provides the response to RU 112 for transmission to client device 104. As another example, connection manager 514 may utilize topology knowledge obtained by monitor 508 to facilitate load balancer 510 to select a route that provides the response to a different RU accessible by device 104.

Memory 310, 406 and 506 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Example Methods of Extended Access Point Operation

Figure 6:
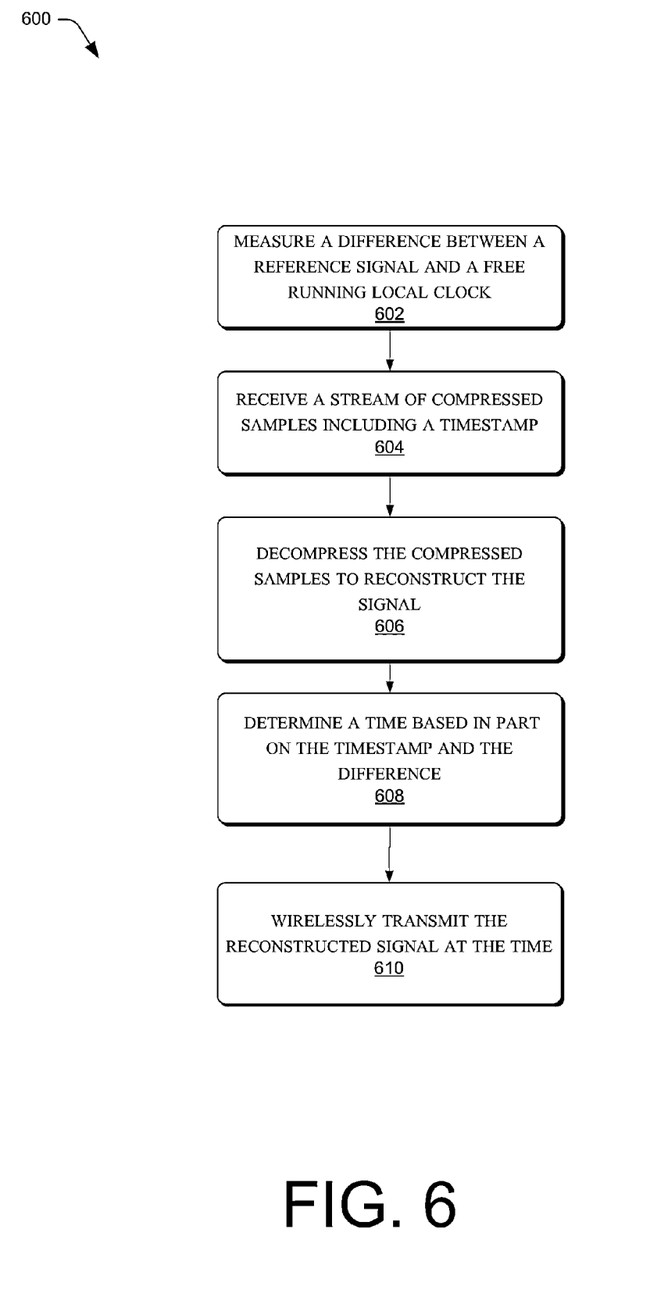
FIG. 6 is a flowchart illustrating an example method of radio unit operation.

FIG. 6 illustrates an example method 600 of operation of a distributed radio unit having a free running clock. The example method 600 begins at block 602, with measuring at least one of an offset or a difference between a wirelessly broadcasted reference signal and a free running clock, such as free running local clock 306 of RU 300. As described herein, the reference signal may be wirelessly broadcasted by a different radio unit. As an example, the reference signal may be wirelessly broadcasted by RU 240 and received by some or all of RU 112-116 and 224-238 of FIG. 2. Radio units may employ reference signal comparator/generator 314 for measuring an offset and/or a difference between a wirelessly broadcasted reference signal and their free running local clock. At block 604, a stream of compressed samples of a signal may be received where at least one of the compressed samples includes a timestamp. As an example, RU 112 may receive a stream of compressed samples from PU 126 that may have used timestamp processor 414 to insert timestamps into the compressed samples. At block 606, the compressed samples may be decompressed to reconstruct the signal. As an example, a radio unit may employ sample decompressor 324 to decompress the compressed samples to reconstruct a baseband signal for modulation and transmission. At block 608, a time may be determined based in part on the timestamp and at least one of the offset or the difference between a wirelessly broadcasted reference signal and the free running clock. As an example, timestamp processor 322 may determine a time for transmission of a modulated form of the reconstructed baseband signal. At block 610, the reconstructed signal may be wirelessly transmitted at the determined transmission time.

The distributed radio unit of example method 600 may comprise a distributed wireless access point. Compressed samples may be evaluated to identify a type of signal associated with the compressed samples, as described herein. A type or process of decompression used on compressed samples may be dependent on a signal type associated with the compressed samples. As an example, based on the signal type, decompression may involve reinserting one or more time-domain guard bands, or one or more frequency guard bands, or both, as part of reconstructing the baseband signal. Once the baseband signal has been appropriately reconstructed, it may then be modulated and transmitted by a radio unit to a corresponding device or entity.

In addition to transmission of a wireless signal, a radio unit may also receive a wireless signal, demodulate the wireless signal to at least one baseband signal, determine its signal type and process the baseband signal based on its signal type to create compressed samples for transport to a selected processing unit. Such processing of the baseband signal may include removing one or more time-domain guard bands, removing one or more guard frequency bands, and/or applying one or more filters to reduce a required sampling rate. Resultant samples of the baseband signal may be quantized based on a determined signal-to-noise ratio (SNR) of the quantized samples.

Figure 7:
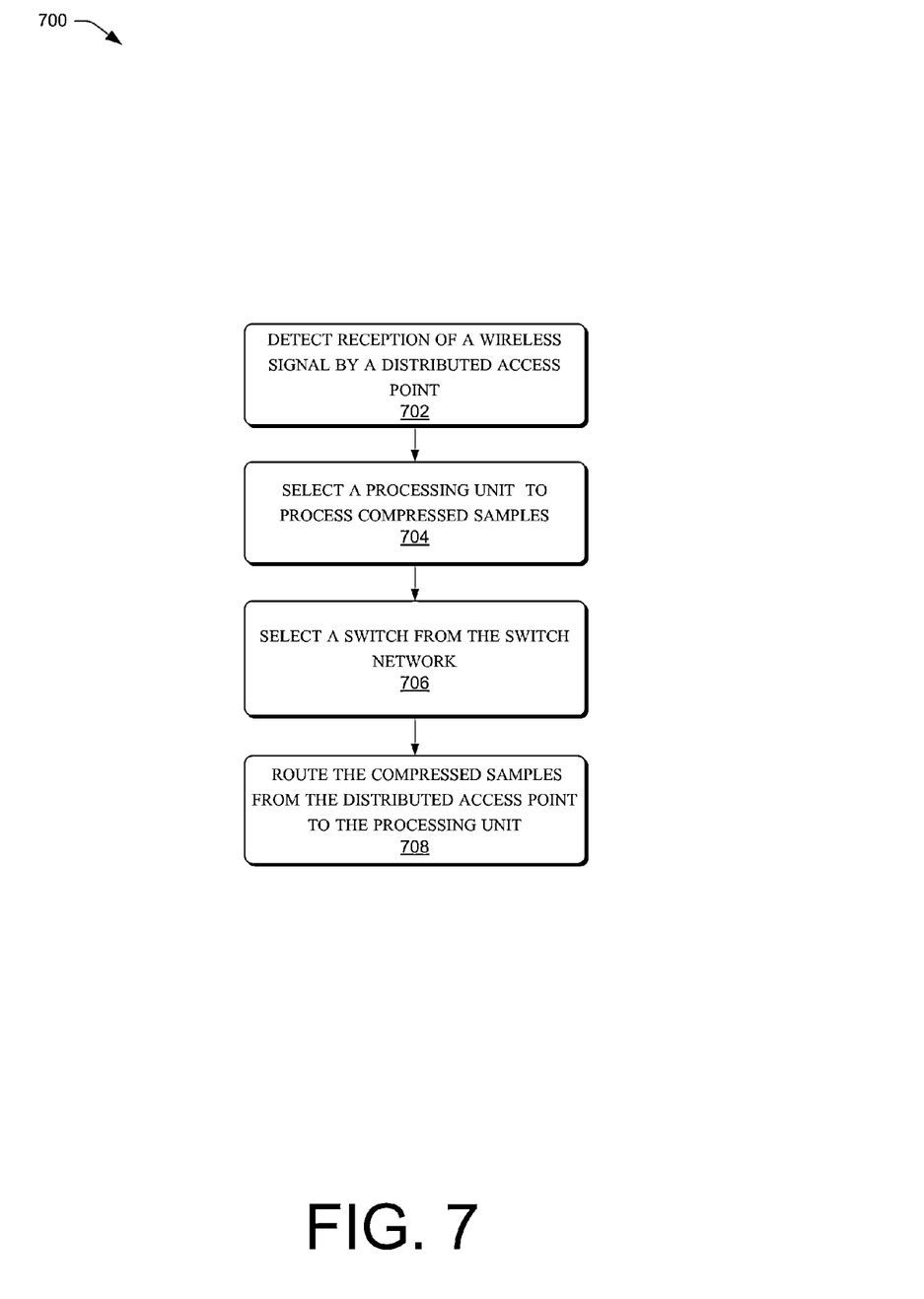
FIG. 7 is a flowchart illustrating an example method of operation within an extended access point.

FIG. 7 illustrates an example method 700 of operation of an extended access point. The example method 700 begins at block 702, with a detection of reception of a wireless signal by a distributed access point of a plurality of distributed access points connected to a first portion of a switch network. As an example, network controller(s) 128 may detect reception of a wireless signal at RU 112 connected to tier 1 switch 210 of FIG. 2. At block 704, a processing unit may be selected from a plurality of processing units connected to a second portion of the switch network to process compressed samples of a baseband signal of the wireless signal. As an example, network controller(s) 128 may select PU 126 connected to tier 1 switch 220 to process the compressed samples. At block 706, a switch from a third portion of the switch network may be selected. As an example, network controller(s) 128 may select tier 2 switch 202. At block 708, the selected switch may be controlled to route the compressed samples from the distributed access point to the processing unit for processing into a digital bit stream. As an example, network controller(s) 128 may direct tier 2 switch 202, as well as tier 1 switches 210 and 220, to connect RU 112 and PU 126 so that PU 126 may receive and process compressed samples from RU 112.

In example method 700, selecting the processing unit may be based in part on a load balancing algorithm. Additionally, a load associated with switches of the first portion, the second portion and the third portion of the switch network as well as a load associated with the plurality of processing units may be monitored to facilitate the load balancing algorithm. A load associated with radio units may also be monitored to facilitate the load balancing algorithm. Such monitoring may be performed by monitor 508.

Additionally, a digital bit stream response associated with the digital bit stream may be detected, for example, by connection manager 514. The previously selected processing unit or a different processing unit may be selected from the plurality of processing units to convert the digital bit stream response into associated compressed samples of an associated baseband signal. The previously selected switch or a different switch may be selected from the third portion of the switch network, such as from tier 2 switches 202-208, and the selected switch may be controlled to route the associated compressed samples to the distributed access point or a different distributed access point of the plurality of distributed access points for decompression and transmission. As an example, network controller(s) 128 may be employed to provide the switch selection and the switch control.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   measuring, at a first distributed radio unit of a wireless access point, at least one of an offset or a difference between a wirelessly broadcasted reference signal received from a second distributed radio unit of the wireless access point and a free running clock of the first distributed radio unit;
   receiving compressed samples of a signal, at least one of the compressed samples including a timestamp;
   decompressing the compressed samples to reconstruct the signal;
   determining, at the first distributed radio unit via use of the free running clock of the first distributed radio unit, a local time at which to transmit the reconstructed signal based in part on the timestamp and at least one of the measured offset or the measured difference; and
   wirelessly transmitting the reconstructed signal in accordance with the determined local time.

2. The method as recited in claim 1, wherein the second distributed radio unit is pre-configured within the wireless access point to broadcast the wirelessly broadcasted reference signal to other distributed radio units within the wireless access point.

3. The method as recited in claim 1, further comprising:
   evaluating the compressed samples; and
   identifying a type of the signal based in part on the evaluating.

4. The method as recited in claim 3, wherein the decompressing is based in part on the type of the signal.

5. The method as recited in claim 1, further comprising:
   receiving a wireless signal;
   determining a type of the wireless signal;
   demodulating the wireless signal to at least one baseband signal;
   processing the at least one baseband signal based on the type of the wireless signal;
   sampling the processed at least one baseband signal to create a stream of samples;
   compressing one or more samples in the stream of samples; and
   creating a stream of compressed samples of the wireless signal based in part on the processing and the compressing.

6. The method as recited in claim 5, wherein the processing includes removing one or more time-domain guard bands of the at least one baseband signal.

7. The method as recited in claim 5, wherein the processing includes removing one or more guard frequency bands of the at least one baseband signal.

8. The method as recited in claim 5, wherein the processing includes applying one or more filters to reduce a sampling rate of the at least one baseband signal.

9. The method as recited in claim 5, wherein the compressing includes quantizing the one or more samples based on a determined signal-to-noise ratio of the one or more samples.

10. A system comprising:
    a plurality of distributed radio units that includes a designated distributed radio unit configured to broadcast a reference signal, individual ones of the plurality of distributed radio units are configured to:
    receive the reference signal from the designated distributed radio unit;
    determine at least one of an offset or a difference between the reference signal and a local clock;
    receive compressed samples having one or more timestamps from a remote processing unit that is different than the designated distributed radio unit;
    decompress the received compressed samples to reconstruct a signal;
    determine a local time at which to wirelessly transmit the reconstructed signal based in part on the one or more timestamps and at least one of the determined offset or the determined difference; and
    wirelessly transmit the reconstructed signal in accordance with the determined local time.

11. The method as recited in claim 2, wherein the wireless access point is configured to cover a defined geographic area.

12. The system as recited in claim 10, wherein the plurality of distributed radio units are located within a defined geographic area and represent a wireless access point.

13. The system as recited in claim 10, wherein individual ones of the plurality of distributed radio units are further configured to:
    evaluate the compressed samples; and
    identify a type of the signal based in part on the evaluating.

14. The system as recited in claim 13, wherein the decompressing is based in part on the type of the signal.

15. A device comprising:
    a local clock;
    one or more processors;
    memory storing instructions that, when executed by the one or more processors, cause the device to:

measure at least one of an offset or a difference between a reference signal received from a distributed radio unit and the local clock;

receive compressed samples of a signal, at least one of the compressed samples including a timestamp;

decompress the compressed samples to reconstruct the signal;

determine, via use of the local clock, a local time at which to transmit the reconstructed signal based in part on the timestamp and at least one of the measured offset or the measured difference; and wirelessly transmit the reconstructed signal in accordance with the determined local time.

16. The device as recited in claim 15, wherein the distributed radio unit is pre-configured within a wireless access point to broadcast the reference signal to other distributed radio units within the wireless access point.

17. The device as recited in claim 16, wherein the wireless access point is configured to cover a defined geographic area.

18. The device as recited in claim 15, wherein the instructions further cause the device to:
evaluate the compressed samples; and
identify a type of the signal based in part on the evaluating.

19. The device as recited in claim 18, wherein the decompressing is based in part on the type of the signal.

20. The device as recited in claim 15, wherein at least one of the measured offset or the measured difference comprises at least one of:
a frequency difference;
a frequency offset;
a phase difference; or
a phase offset.

* * * * *